UNITED STATES PATENT OFFICE.

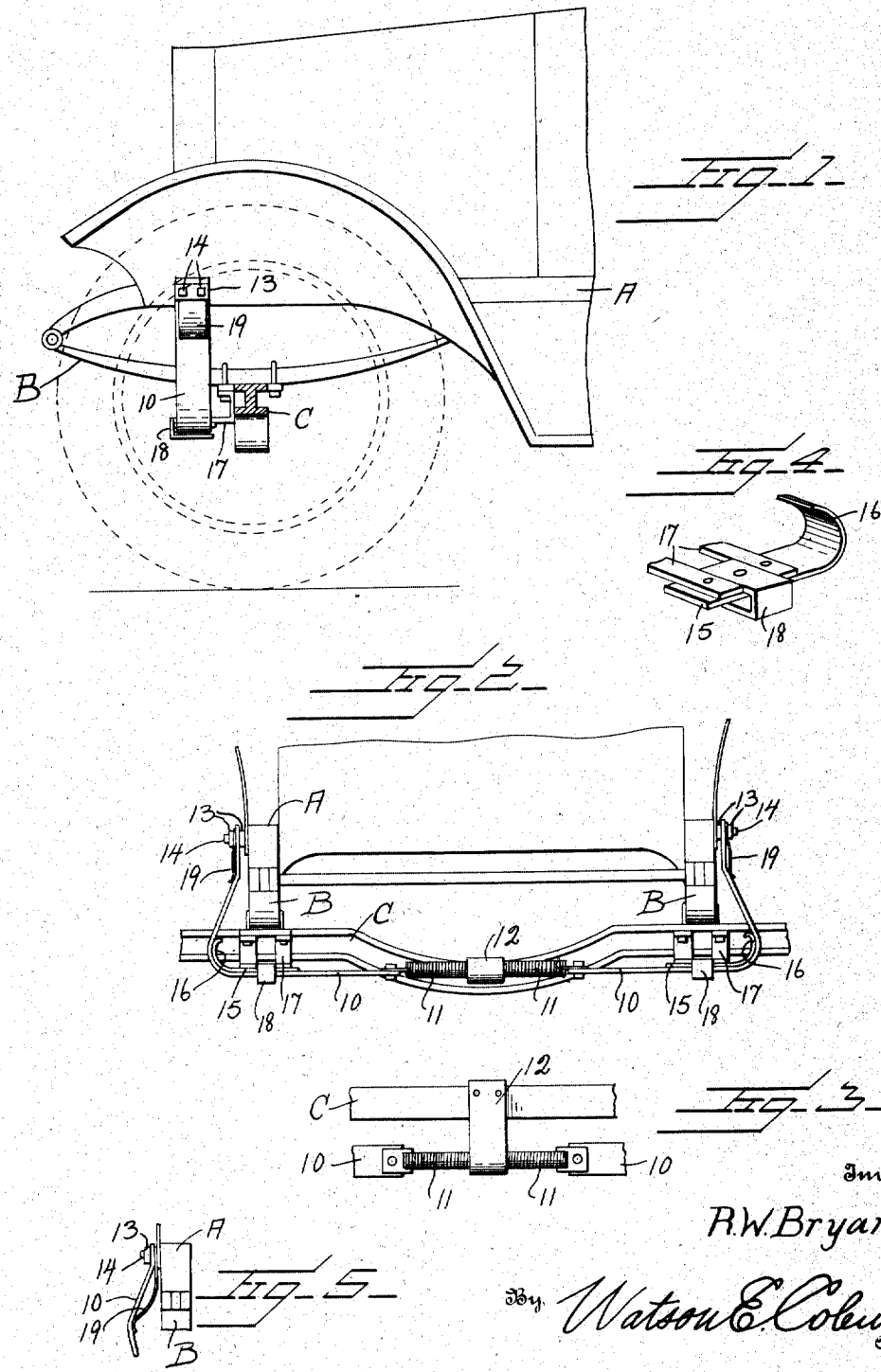

ROBERT W. BRYAN, OF ABERDEEN, WASHINGTON.

SHOCK-ABSORBER FOR AUTOMOBILES.

1,302,630.      Specification of Letters Patent.      Patented May 6, 1919.

Application filed August 10, 1918. Serial No. 249,252.

*To all whom it may concern:*

Be it known that I, ROBERT W. BRYAN, a citizen of the United States, residing at Aberdeen, in the county of Grays Harbor and State of Washington, have invented certain new and useful Improvements in Shock-Absorbers for Automobiles, of which the following is a specification, reference being had to the accompanying drawings.

This invention relates to automobile attachments, and particularly to shock absorbers, and the general object of the invention is to provide a very simple form of shock absorber easily applied to all cars, cheaply made and which is in the form of a "snubber" which resiliently resists the rise of the chassis of a car relatively to the axle thereof, and thereby resists the undue vibration of the springs.

A further object of the invention is to provide a shock absorber of this character including a strap or flexible band, and a spring connected thereto, the band being connected at one end to the chassis of the automobile and passing downward to a point beneath the axle and then extending laterally of the car, the spring to which the band is connected being attached at one end to the axle of the car.

A further object in this connection is to provide a construction of the character above described in which the strap is held in a deflected position by means of a small leaf spring which absorbs vibration transmitted from the axle to the chassis.

A further object is to provide a shoe attachable to the axle of the machine and beneath which the strap of the snubber or shock absorber passes.

Other objects will appear in the course of the following description.

My invention is illustrated in the accompanying drawings, wherein:—

Figure 1 is a side elevation of the forward end of an automobile with the axle in section and showing my shock absorber applied;

Fig. 2 is a fragmentary front elevation of an automobile with the shock absorber applied;

Fig. 3 is a fragmentary top plan view of the axle and a portion of the shock absorber;

Fig. 4 is a perspective view of the shoe; and

Fig. 5 is a fragmentary end elevation of one of the supporting beams of the automobile showing a different manner of arranging the spring 19.

Referring to these figures, it will be seen that I have illustrated my shock absorber as applied to a car of an ordinary commercial form having the longitudinally extending supporting frame beams A, the usual semi-elliptical spring B, and an axle, as for instance, the front axle C. I have illustrated this shock absorber as applied to the forward end of the car, but it is to be understood that it may be applied to any portion of the car and preferably it is to be applied to the rear ends of the car. The shock absorber comprises a stop or band 10 which may be made of leather or thin metal, or of any suitable material, but which is preferably leather, one end of this band having attached to it the coiled contractile spring 11, which in turn is connected to a suitable clamp 12, which may be attached to the axle C.

The opposite end of the band 10 is held to the frame beam A by means of metal plates 13, between which the band passes, and a bolt or screw 14. I do not wish to be limited to this manner of connecting the band 10 to the frame A, as other means may be used.

Disposed beneath the spring B is a shoe 15 formed of a plate of metal, the outer end of which is bent upward and inward in a curve, as at 16, this plate 15 having a pair of brackets 17 attached thereto, these brackets being adapted to be attached to the axle. Attached to the plate 15 is a tongue 18 which extends downward and forward and then inward parallel to the plate 15. The strap 10 extends downward from the frame A and around the curved end 16 of this shoe plate 15 and then transversely to the clamp 12, the tongue 18 extending beneath and guiding the strap 10. The curved end 16 of the shoe tends to carry the band or strap 10 outward from the spring B.

Attached to the bolts 14, in any suitable manner, and normally extending downward and inward, is a leaf spring 19. The pressure of this spring normally acts to cause the upper portion of the band 10 to extend straight downward from its point of attachment to the frame beam A and below the spring 19 the strap extends downward and outward to the curved portion 16 of the shoe 15 and then laterally to the clamp 12. Now it will be obvious that upward strain on the frame A, in other words, on the chassis of the vehicle, will tend to straighten this strap 10, and that this tendency of the strap to straighten is yieldingly resisted by the spring 19. Thus this spring 19 acts to take up the small vibrations which would otherwise be communicated from the axle to the chassis. When the machine is subjected to a jolt or jar, which tends to cause the chassis to rise with relation to the spring B, in other words, cause an undue separation between the spring and the chassis or between the axle and the chassis, then the strap 10 not only straightens out against the force of the spring 19 but the spring 11 is expanded and this spring 11 resists the undue yielding movement of the spring B and the undue movement of the chassis with relation to the axle and dampens the action of the spring B or "snubs" it in an obvious manner.

Preferably the two springs 11 of each shock absorber are connected to the member 12 and preferably each pair of shock absorbers, designed for either the rear or the front of the vehicle, will be connected to each other by means of a member 12. This member 12 may be, and preferably is, connected to the axle though this is not absolutely necessary.

While I have illustrated the spring 19 as deflecting the strap 10 inward, it will be obvious that this spring may also deflect the strap 10 outward and secure the same result, as illustrated in Fig. 5. In either case the strap is deflected by the spring so that light vibrations will be taken up. I have found that by disposing the shock absorbers or snubbers transversely to the machine that a much better effect is secured than if the shock absorbers were disposed longitudinally of the machine but I do not wish to limit myself to this manner of placing the shock absorbers.

I claim:—

1. A shock absorber comprising a flexible connection, a contractile spring attached at one end to the flexible connection, means for connecting the spring to a fixed point on the part of the vehicle beneath the chassis and connecting the flexible connection at the end opposite the spring to the chassis of the vehicle, the flexible connections being extended beneath a portion of the vehicle body and then extended upward to the chassis of the vehicle, and a spring acting to deflect the flexible connection from a straight line to thereby take up vibration.

2. A shock absorber or snubber for automobiles comprising a main spring adapted to be operatively connected to the axle of the automobile, a flexible strap attached at one end to the main spring, adapted to be passed beneath a part operatively connected to the axle, and then extended upward, said strap at its end opposite the main spring having means whereby it may be attached to the body supporting frame of the automobile, and resilient means normally holding a portion of the strap deflected from a straight line.

3. A shock absorber or snubber for automobiles including a flexible strap adapted to be operatively connected at one end to the wheel carrying frame of the automobile and at its other end to the body supporting frame of the automobile, said strap being normally held taut, and a spring normally holding a portion of the strap deflected from a straight line but yielding to strain on the strap.

4. A shock absorber or snubber for automobiles comprising a main spring operatively connected to the axle of the automobile, a flexible strap attached at one end to the main spring and adapted to be passed beneath a part of the automobile operatively connected to the axle and then extended upward and having means at this end whereby it may be attached to the body supporting frame of the automobile, and a shoe beneath which the strap passes, said shoe being disposed at the angularly related portions of the strap, the shoe having a longitudinal portion adapted to be disposed in a horizontal plane, and an upwardly and outwardly curved end portion against which the strap bears.

5. A shock absorber or snubber for automobiles comprising a main spring operatively connected to the axle of the automobile, a flexible strap attached at one end to the main spring and adapted to be passed beneath a part of the automobile operatively connected to the axle and then extended upward and having means at this end whereby it may be attached to the body supporting frame of the automobile, a shoe beneath which the strap passes, said shoe being disposed at the angularly related portions of the strap, the shoe having a longitudinal portion adapted to be disposed in a horizontal plane, an upwardly and outwardly curved end portion against which the strap bears, and an auxiliary spring normally holding the upwardly extending portion of the strap deflected from a straight line.

6. The combination with an automobile having a body supporting frame, an axle, and springs supporting the frame from the axle, of a snubbing device including a flexible element operatively connected at one end to the body supporting frame and extending downward beneath the spring and then laterally at right angles, a main spring attached to said strap, means for connecting the opposite end of the main spring to the axle, and a shoe disposed beneath the spring of the vehicle and against which the strap bears, said shoe at its outer end being upwardly curved.

7. The combination with an automobile having a body supporting frame, an axle, and springs supporting the frame from the axle, of a snubbing device including a flexible element operatively connected at one end to the body supporting frame and extending downward beneath a spring and then laterally at right angles, a main spring attached to said strap, means for connecting the opposite end of the main spring to the axle, a shoe disposed beneath the spring of the vehicle and against which the strap bears, said shoe at its outer end being upwardly curved, and an auxiliary spring operatively connected to the frame of the vehicle and bearing against the upwardly extending portion of the strap and deflecting it from a straight line.

8. The combination with an automobile having a body supporting frame, an axle, and springs supporting the frame from the axle, of a snubber or shock absorber comprising a pair of coiled contractile springs operatively connected at their meeting ends to the axle of the automobile and extending laterally in opposite directions parallel to said axle, straps attached to the outer end of each spring and extending in opposite directions, and members mounted upon the axles beneath which the straps pass, the straps then extending upward and being attached at their upper ends to the body supporting frame of the automobile.

9. As an article of manufacture, a snubber or shock absorber for automobiles comprising a pair of coiled contractile springs, means connected to said springs whereby the springs may be connected to the axle of an automobile, straps attached to each of said springs and extending in opposite directions, means attached to the ends of the straps for connecting the ends of the straps to the body supporting frame of the automobile, and shoes, one for each strap adapted to be disposed beneath the springs of the automobile and support the strap, each shoe having an upwardly and outwardly turned end.

10. As an article of manufacture, a snubber or shock absorber for automobiles comprising a coiled contractile main spring, means for attaching the main spring to the axle of an automobile, a strap attached to the spring, a plate engaged with the opposite end of the strap and adapted to be engaged with the body supporting frame of the automobile, and a curved leaf spring attached to said plate and in use bearing against the strap and deflecting it from a straight line.

In testimony whereof I hereunto affix my signature in the presence of two wintesses.

ROBERT W. BRYAN.

Witnesses:
G. T. NEWMAN,
E. S. AVEY.

Copies of this patent may be obtained for five cents each, by addressing the "Commissioner of Patents, Washington, D. C."